Dec. 18, 1934.   H. KARL   1,984,584
AEROPLANE
Filed Oct. 27, 1931   3 Sheets-Sheet 1
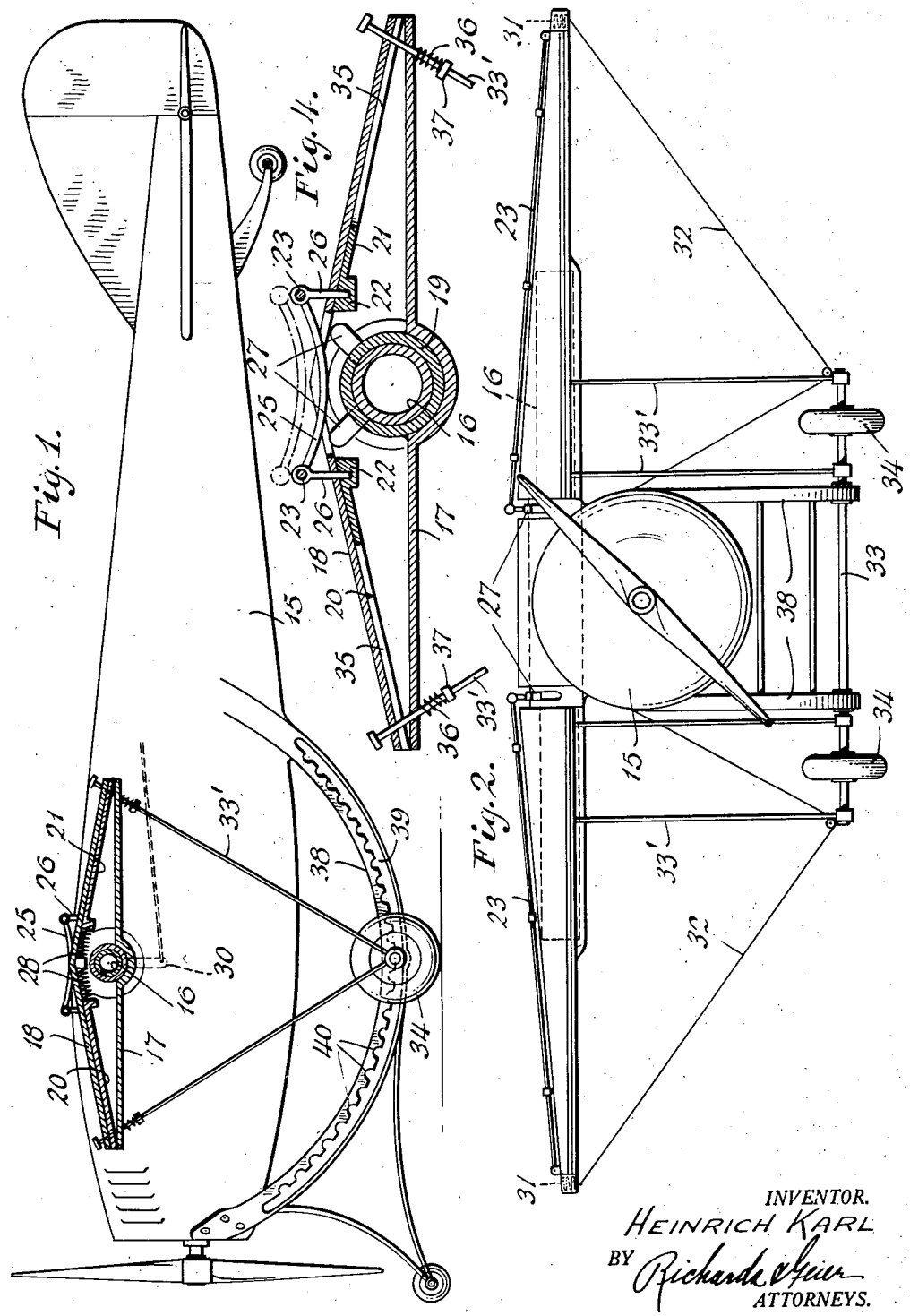
INVENTOR.
HEINRICH KARL
BY Richards & Geier
ATTORNEYS.

Dec. 18, 1934.  H. KARL  1,984,584
AEROPLANE
Filed Oct. 27, 1931  3 Sheets-Sheet 2
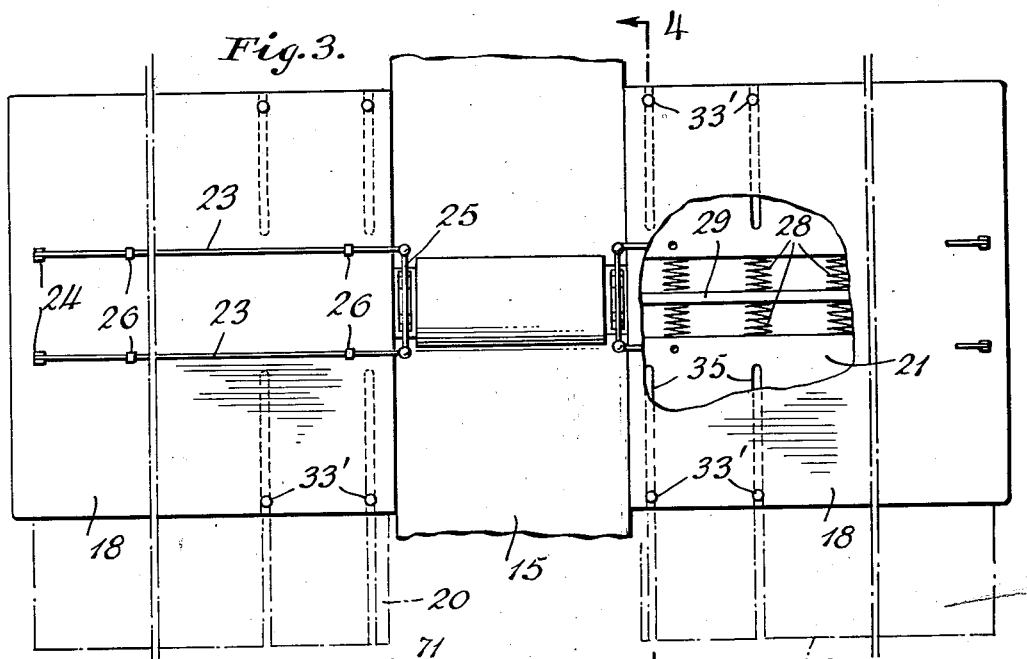
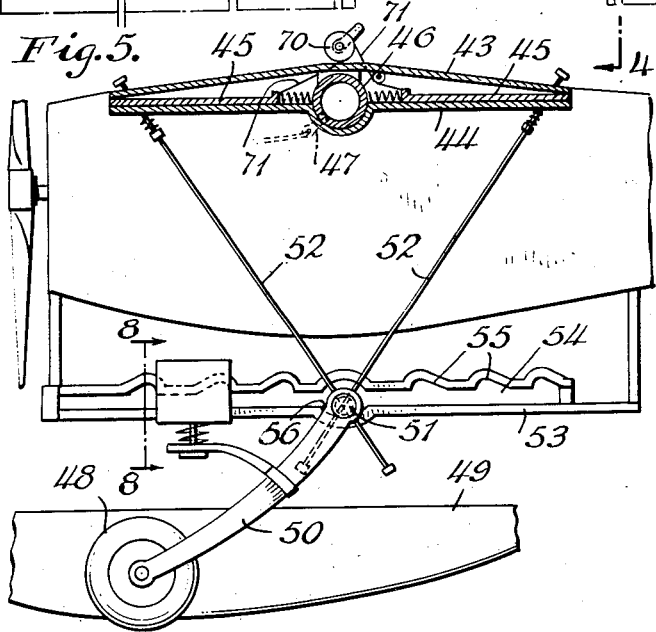
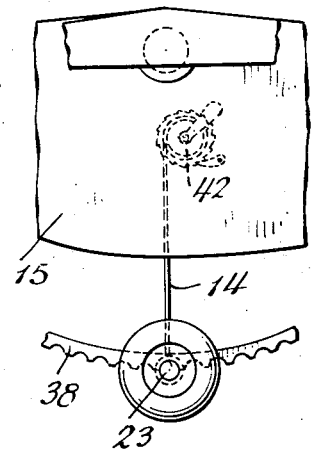
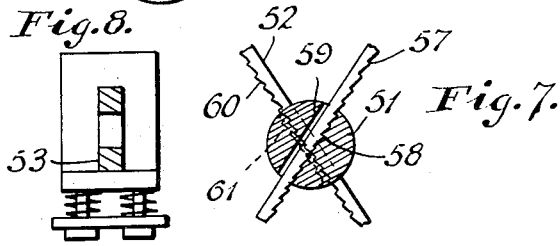
INVENTOR.
HEINRICH KARL
BY Richards Meier
ATTORNEYS.

Dec. 18, 1934.　　　　　H. KARL　　　　　1,984,584
AEROPLANE
Filed Oct. 27, 1931　　　3 Sheets-Sheet 3
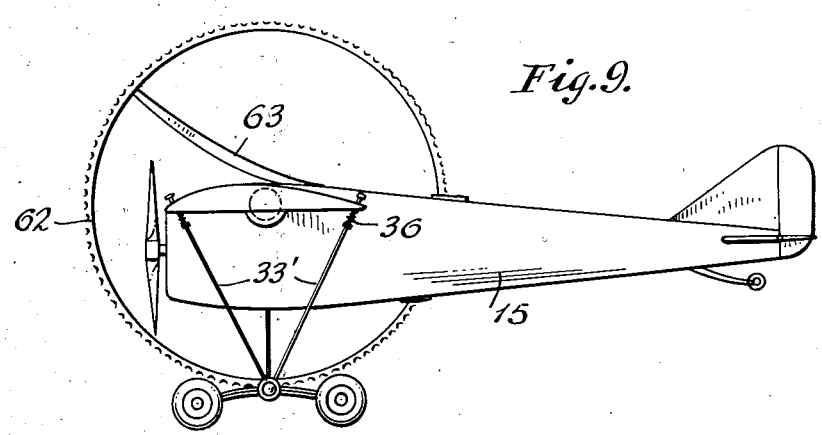
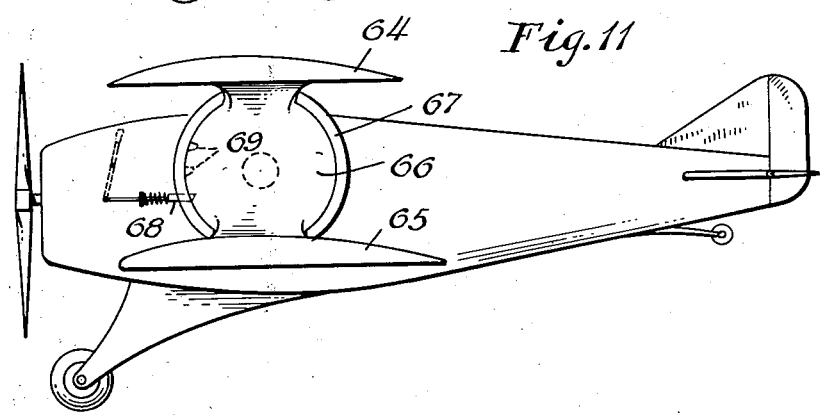
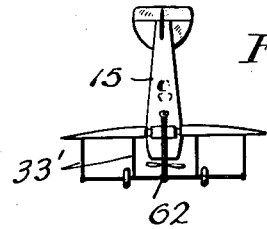
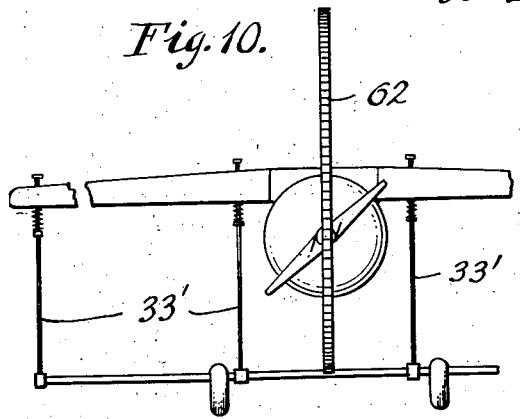
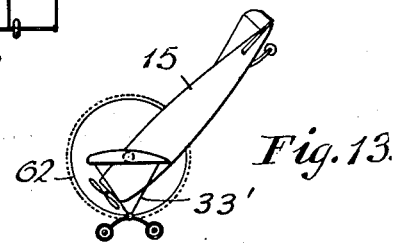
INVENTOR.
HEINRICH KARL
BY *Richards Geier*
ATTORNEYS.

Patented Dec. 18, 1934

1,984,584

UNITED STATES PATENT OFFICE 1,984,584

AEROPLANE

Heinrich Karl, Jersey City, N. J.

Application October 27, 1931, Serial No. 571,305

22 Claims. (Cl. 244—12)

This invention relates to improvements in aeroplanes and has particular reference to safety appliances therefor.

An object of the invention is to so mount the wings of the machine relative to the fuselage that they will offer a maximum resistance to the air beneath the same when the fuselage is in an inclined position.

Another object is to revolubly mount the wings of the aeroplane upon the fuselage and to suspend the landing gear from said wings so that the former will act as a counterbalance to maintain said wings horizontal irrespective of the longitudinal inclination of the fuselage when in flight.

A further object is to provide the fuselage with a locking device adapted for engagement with a portion of the landing gear to releasably maintain the revoluble wings in fixed relation to the fuselage.

A still further object is to afford means for increasing the effective area of the wings by providing the same with extensions which can be automatically projected to operative positions by a movement of the fuselage to a longitudinally inclined position.

The above and other objects will appear more clearly from the following detailed description, when taken in connection with the accompanying drawings, which illustrate preferred embodiments of the inventive idea.

In the drawings—

Figure 1 is a side elevation of an aeroplane constructed in accordance with the invention, one of the wings of the aeroplane being shown in transverse section;

Figure 2 is a front elevation;

Figure 3 is a fragmentary top plan view, partly broken away and showing the wing construction;

Figure 4 is a section substantially on the line 4—4 of Figure 3;

Figure 5 is a fragmentary side elevation, partly in section, showing a different form of construction from that illustrated in Figure 1;

Figure 6 is a fragmentary elevation of a detail;

Figure 7 is a fragmentary sectional view of another detail;

Figure 8 is a section on the line 8—8 of Figure 5;

Figure 9 is a side elevation of another form of the invention;

Figure 10 is a fragmentary front elevation of the form shown in Figure 9;

Figure 11 is a side elevation of still another form of the invention, showing its adaptation to a biplane;

Figure 12 is an elevational view illustrating the relative positions of the fuselage and wings when the former has assumed a vertical position as in a nose-dive; and Figure 13 is a side elevation illustrating the relative positions of the fuselage and wings when the former is at an angle of approximately 45° to the horizontal.

Referring more particularly to Figures 1 to 4, wherein the invention is illustrated in connection with a monoplane, the numeral 15 indicates a fuselage which may be of any desired construction.

The wings of the aeroplane are mounted on opposite sides of the fuselage in the customary manner and, in accordance with the present invention, are supported so that there will be a relative rotary movement between the wings and fuselage about an axis extending transversely through the latter. For this purpose, there is extended through the fuselage and projected on opposite sides thereof a hollow supporting shaft 16, each projecting section of which forms the axis of rotation of one of the wings of the aeroplane. As shown, each wing comprises spaced upper and lower sections 17 and 18, the latter section having front and rear portions which are inclined toward the respective edges of the wing. The section 17 carries a bearing member 19 which encircles the shaft 16 and about which the wing has a relative rotary movement. It is desirable at times, such as when the fuselage assumes a dangerous angle of inclination relative to the horizontal, to increase the effective area of the wing so that it will offer more resistance to the air. For this purpose, each wing has normally recessed therein the forward and rear extensions 20 and 21 which, as shown in Figure 4, are supported in engagement with the underside of the section 18. These sections, at the proper time, are adapted to be automatically projected to extended positions beyond the front and rear edges of the wing, as indicated in dotted lines in Figure 3, and when the same are completely extended the enlarged portions 22 at the inner edges of said extensions wedge between the upper and lower sections 17 and 18 adjacent the edges of the wing and thereby brace the extensions in their projected positions.

To maintain the extensions 20 and 21 in their normal positions between the wing sections, a locking device is provided for each wing in the form of a pair of rods 23 pivoted at 24 to the wing adjacent the outer end thereof and joined at their inner ends adjacent the fuselage by a curved cross-bar 25. The rods 23 have depending therefrom a series of pins 26 which project downwardly through the upper section 18 and engage in recesses in the enlargements 22 of the extensions 20 and 21, thereby retaining the latter in their normal positions. The locking device remains in its operative position until there is a relative rotary movement between the wings and fuselage, such as when the latter assumes a longitudinally inclined position. Should this occur, either one of two projections 27 carried by the shaft 16 directly below each cross-bar 25 contacts with the latter to raise the locking device to the dotted line position shown in Figure 4, whereupon the various pins 26 will be withdrawn from engagement with the extensions 20 and 21 and the latter will be projected outwardly in opposite directions by the coil springs 28 interposed between the inner edges of said extensions and a central abutment 29.

Should it be desired to manually rotate the wing about the shaft 16 and relative to the fuselage, and thus effect the projection of the extensions 20 and 21, a lever 30 (Figure 1) may be connected to the wing and controlled from the cockpit of the fuselage.

Further means are provided for increasing the effective supporting surfaces of the wings and these means are in the form of two flexible extensions 31 (Figure 2) made of fabric or other suitable material and each normally folded in a compartment formed in one of the wing tips. The ends of these flexible extensions are connected by guy wires 32 to the cockpit where any suitable means may be provided for pulling these guy wires so as to withdraw the extensions 31 from their compartments to positions extending diagonally downward beneath the under surface of the wing in which the extension is located. These flexible extensions 31 thus provide additional wind pressure surfaces which act in the nature of a parachute to reduce the velocity of the aeroplane when falling.

The landing gear of the aeroplane is designed, when the machine is in flight, to act as a counterbalancing weight for the wings so as to maintain the same in horizontal position, or substantially so, irrespective of the longitudinal inclination of the fuselage. For this purpose, the landing gear is suspended from the wings and is shown as comprising an axle 33 carrying the wheels 34 and having connected thereto a plurality of pairs of hanger rods 33', the rods of each pair diverging upwardly and passing through the wings at points adjacent the front and rear edges thereof, as best illustrated in Figure 4. These hanger rods also extend through transverse slots 35 formed in the extensions 20 and 21, said slots being provided for the purpose of permitting the extensions to be projected from between the sections of the wings when the locking device, including the pins 26, is operated. Heavy coil springs 36 are interposed between the lower sections 17 of the wings and the fixed collars 37 on the rods 33' and act as shock absorbers when the aeroplane is making a landing. Means are further provided for maintaining a fixed relation between the wings and fuselage when the aeroplane is resting on the ground or other supporting surface. This means, as shown in the embodiment of Figure 1, comprises a pair of segmental racks 38 fixedly secured and depending from the fuselage in a position concentric to the axis of rotation of the wings. Each of the racks 38 has formed therein a slot 39, the upper edge of which is provided with a series of notches 40, any one of which is designed to receive the axle 33 of the landing gear when the aeroplane is resting upon a supporting surface. When the axle is so engaged, there is produced, in effect, an interlocking of the fuselage with the wings through the medium of the landing gear, which will prevent any relative movements between the former elements.

Should it be desired to produce the interlocking connection between the fuselage and wings during flight, the landing gear may have connected thereto a flexible element 41 (Figure 6) adapted to be wound upon a drum 42 within the fuselage which can be rotated by the pilot to draw the landing gear upwardly against the tension of the springs 36 until the axle 33 is engaged in one of the notches 40.

In the form of the invention shown in Figures 5 to 8, each wing comprises upper and lower sections 43 and 44 and the extensions 45, similar to the extensions 20, 21, but, in this instance, said extensions are slidably mounted upon the lower section 44. The wing is also revoluble about the shaft 46 and may be locked thereto, if desired, by a pin 47 under the manual control of the pilot.

The landing gear may be of the amphibian type, including wheels 48 and pontoons 49 supported by a hanger 50 having the axle 51, which is the equivalent of the axle 33. This landing gear is supported by hanger rods 52 which pass through the axle 51 in the present instance and diverge upwardly to the front and rear edges of the wings through which said rods also pass, as previously described in connection with the form of the invention shown in Figure 1. Instead of using an arcuate rack, such as the rack 38, the present form employs a straight rack 53 affixed to and suspended from the fuselage and provided therein with a slot 54, the upper edge of which is formed with a series of notches 55. When the fuselage and wings are in a horizontal position, as shown in Figure 5, and the machine is in flight, the axle 51 rests in a depression 56 in the center of the rack. Should the fuselage assume an inclined position, as, for instance, when the machine is nosing down, the axle 51 will pass from the depression 56 into the slot 54 and toward the forward end of the rack 53. Each wing of the machine will, however, remain in a horizontal position, due to the engagement of the teeth 57 of the hanger rod 52 which extends to the rear edge of the wing, with the serrated surface 58 of the opening 59 in the axle through which said hanger rod passes. The other hanger rod 52, which also has a toothed edge 60, is free to move in its opening 61 in the axle and, consequently, the wing will remain in its horizontal position. If the longitudinal inclination of the fuselage should be the reverse of that previously mentioned, then the rod with the teeth 57 will be free to move in its opening 59, while the teeth 60 will engage the serrated edge of the opening 61.

In Figure 9, the construction is practically identical with that shown in Figure 1, with the exception that, for the racks 38 of the latter embodiment, there is substituted a single circular rack 62 supported by the fuselage by means of a brace 63 and disposed in a vertical plane extending through the center of the fuselage. This circular rack will permit of the interconnection of the fuselage and landing gear in any position of rotation of the fuselage about the axis of the shaft which supports the wings.

In Figure 11, the invention is shown as applied to a biplane, consisting of the upper and lower wings 64 and 65 which are connected by a disk-like structure 66 mounted for rotary movement in a bearing 67 carried by the fuselage of the machine. A sliding spring-pressed lock 68 carried by the fuselage and operable from the cockpit of the machine is adapted to extend through the bearing 67 and engage in any one of a series of notches 69 formed in the disk-like structure 66 so as to interlock the wings with the fuselage and thereby prevent any relative rotary movements between said elements whenever desired. However, when the latch 68 is withdrawn from any of the notches 69, the fuselage and wings will have relative rotary movement and, should the fuselage assume an inclined position, the wings 64 and 65 will remain in a horizontal position because of the fact that the lower wing is made considerably heavier than the upper one, thus producing a counterbalancing effect similar to that previously mentioned in connection with the landing gear of the first embodiment described.

In Figures 12 and 13, there are illustrated graphically, in connection with the embodiment shown in Figure 9, different positions that the fuselage of the machine might assume in flight and the horizontal relation of the wings of the aeroplane in such positions. Thus, where the fuselage is in a vertical diving position as shown in Figure 12, or an inclined position as illustrated in Figure 13, the counterbalancing effect of the landing gear will maintain the wings of the aeroplane in a horizontal position, owing to the rotative relation between said wings and fuselage.

Means are also provided in connection with the invention for withdrawing the wing extensions 20, 21 and 45 into their normal retracted positions after having been extended. This means, which is capable of application to both of the forms of the invention illustrated in Figures 1 and 5, is more or less diagrammatically shown in the latter figure and comprises a drum 70 on which are wound the flexible elements 71 connected to the front and rear extensions of the wings, so that when the drum is turned in the proper direction the extensions will be recessed between the sections of the wings.

What is claimed is:

1. In an aeroplane, a fuselage, wings therefor, means to support said wings on said fuselage so that the latter can swing from a horizontal to a vertical position relative to said wings, and means automatically to maintain said wings in a horizontal position during any turning movement of said fuselage between horizontal and vertical positions thereof.

2. In an aeroplane, a fuselage, wings therefor, means to mount said wings to permit of free and automatic rotary movement of said fuselage relative thereto, a landing gear disconnected from the fuselage relative to which said fuselage has a turning movement about a transverse axis, and connections between said landing gear and wings for balancing and maintaining the latter in a horizontal plane during said turning movement of the fuselage.

3. In an aeroplane, a fuselage, wings therefor, means to mount said wings to permit of rotary movement of said fuselage relative thereto, a landing gear relative to which said fuselage has a turning movement about a transverse axis, connections between said landing gear and wings for maintaining the latter in a horizontal plane during said turning movement of the fuselage, and a rack carried by said fuselage and with which a portion of said landing gear is engageable, when the aeroplane is resting on a supporting surface, to prevent relative rotary movements between said wings and fuselage.

4. In an aeroplane, a fuselage, wings therefor, means to mount said wings to permit of rotary movement of said fuselage relative thereto, a landing gear relative to which said fuselage has a turning movement about a transverse axis, connections between said landing gear and wings for maintaining the latter in a horizontal plane during said turning movement of the fuselage, a rack carried by said fuselage and with which a portion of said landing gear is engageable, when the aeroplane is resting on a supporting surface, to prevent relative rotary movements between said wings and fuselage, and manually controlled means for engaging said rack with said portion of the landing gear when the aeroplane is in flight.

5. In an aeroplane, a fuselage, wings therefor relative to which the fuselage has a turning movement, extensions for said wings normally in a retracted position, means to retain said extensions in normal position, and means controlled by a turning movement of said fuselage relative to said wings to release the last-named means so that said extensions are free to move to projected positions to increase the effective supporting surfaces of said wings.

6. In an aeroplane, a fuselage, wings therefor relative to which the fuselage has a turning movement, each including upper and lower sections, an extension slidable between said sections and normally in a retracted position therebetween, a locking device engageable with said extension to maintain the same in normal position, and means controlled by a turning movement of the fuselage relative to said wings to withdraw said locking device from engagement with said extension.

7. In an aeroplane, a fuselage, wings therefor relative to which the fuselage has a turning movement, each including upper and lower sections, an extension slidable between said sections and normally in a retracted position therebetween, a locking device engageable with said extension to maintain the same in normal position, means controlled by a turning movement of the fuselage relative to said wings to withdraw said locking device from engagement with said extension, and spring means to project said extension from between said sections when said locking device is withdrawn.

8. In an aeroplane, a fuselage, wings therefor, means to mount said wings to permit of rotary movement of said fuselage relative thereto, a landing gear relative to which said fuselage has a turning movement about a transverse axis, extensions for said wings normally in a retracted position, means to releasably retain said wings in said position, and means operated by a relative rotary movement between said wings and fuselage for actuating said retaining means to release said extensions.

9. In an aeroplane, a fuselage, wings therefor, means to mount said wings to permit of rotary movement of said fuselage relative thereto, a landing gear relative to which said fuselage has a turning movement about a transverse axis, extensions for said wings normally in a retracted position, means to releasably retain said wings in said position, means operated by a relative rotary movement between said wings and fuselage for actuating said retaining means to release said extensions, and connections extending from said landing gear upwardly through said wings and extensions for maintaining the wings in a horizontal position during turning movement of said fuselage.

10. In an aeroplane, a fuselage, wings therefor, extensions for said wings normally in a retracted position relative thereto, means to project said extensions from the front and rear edges of said wings, and a flexible extension contained in the end of each wing and movable therefrom to a position beneath said wing.

11. In an aeroplane, a fuselage, wings therefor, means to revolubly support said wings on said fuselage, a landing gear depending from said wings, and a segmental rack carried by said fuselage concentric to the axis of rotation of said wings and releasably engageable by a portion of said landing gear to prevent turning of said wings relative to said fuselage.

12. In an aeroplane, a fuselage, and wings therefor mounted to automatically assume a horizontal position irrespective of the position of the fuselage when the aeroplane is in flight.

13. In an aeroplane, a fuselage, wings therefor, means to mount said wings to permit of rotary movement of said fuselage relative thereto, a landing gear relative to which said fuselage has a turning movement about a transverse axis, extensions for said wings normally in a retracted position, means to releasably retain said extensions in said position, means operated by a relative rotary movement between said wings and fuselage for actuating said retaining means to release said extensions, connections extending from said landing gear upwardly through said wings and extensions for maintaining the wings in a horizontal position during turning movement of said fuselage, and means for manually turning said wings in a rotary direction relative to said fuselage.

14. In an aeroplane, a fuselage, wings therefor, extensions for said wings normally in a retracted position, means to retain said extensions in normal position, means on the wings operated by the fuselage to automatically release the last-named means when the aeroplane assumes a dangerous inclination so that said extensions are free to move to projected positions in which they are inclined downwardly relative to the under surfaces of said wings and extend below the same so as to increase the effective supporting surfaces of said wings.

15. In an aeroplane, a fuselage, wings therefor having a movement relative to said fuselage, a landing gear relative to which said fuselage has a turning movement about a transverse axis thereof, connections between said landing gear and wings for maintaining the latter in a horizontal plane during a relative turning movement between the fuselage and wings, and means carried by said fuselage with which said landing gear is engageable to prevent relative movements between said wings and fuselage when said gear is resting on a supporting surface.

16. In an aeroplane, a fuselage, wings therefor having a movement relative to said fuselage, a landing gear relative to which said fuselage has a turning movement about a transverse axis thereof, connections between said landing gear and wings for maintaining the latter in a horizontal plane during a relative turning movement between the fuselage and wings, means carried by said fuselage with which said landing gear is engageable to prevent relative movements between said wings and fuselage when said gear is resting on a supporting surface, and manually controlled means for engaging the last-named means with said landing gear when the aeroplane is in flight.

17. In an aeroplane, a fuselage, wings therefor and a flexible extension contained in the end of each wing and movable therefrom to a position beneath said wing.

18. In an aeroplane, a fuselage, a landing gear responding to movements of the fuselage relative to the horizontal plane in such manner as to cause the aeroplane to land on the landing gear while automatically rightening the fuselage into normal position irrespective of the amount of the inclination of the fuselage during flight.

19. In an aeroplane, a fuselage, and a landing gear responding to movements of the fuselage relative to a horizontal plane in such manner as to cause the aeroplane to land first on the landing gear while automatically rightening the fuselage to normal position irrespective of the amount of inclination of the fuselage with respect to the horizontal.

20. In an aeroplane, a fuselage, wings therefor, mounting means for said fuselage on said wings permitting unlimited relative revolving movements, and means for automatically balancing said wings in horizontal position for any position of the fuselage.

21. In an aeroplane, a fuselage, wings therefor, a mounting for said wings supporting the same for rotating movement of more than 180° from the normal position relative to said fuselage, and means for balancing said wings in such a manner that they automatically stay in horizontal position regardless of the position taken by said fuselage during flight.

22. In an aeroplane, a fuselage, wings therefor, a mounting for said wings supporting the same for unlimited rotating movement from the normal position relative to said fuselage, said wings balanced in such manner that they automatically stay in horizontal position regardless of the position taken by said fuselage during flight.

HEINRICH KARL.